United States Patent
Mori et al.

(10) Patent No.: US 9,470,156 B2
(45) Date of Patent: Oct. 18, 2016

(54) VEHICLE ENGINE AUTOMATIC CONTROL DEVICE AND VEHICLE ENGINE AUTOMATIC CONTROL METHOD

(71) Applicant: NISSAN MOTOR CO., LTD., Kanagawa (JP)

(72) Inventors: Kouichi Mori, Kanagawa (JP); Motoyuki Hattori, Kanagawa (JP)

(73) Assignee: Nissan Motor Co., Ltd., Kanagawa (JP)

(*) Notice: Subject to any disclaimer, the term of this patent is extended or adjusted under 35 U.S.C. 154(b) by 123 days.

(21) Appl. No.: 14/363,016

(22) PCT Filed: Nov. 16, 2012

(86) PCT No.: PCT/JP2012/079803
§ 371 (c)(1),
(2) Date: Jun. 5, 2014

(87) PCT Pub. No.: WO2013/084696
PCT Pub. Date: Jun. 13, 2013

(65) Prior Publication Data
US 2014/0336908 A1    Nov. 13, 2014

(30) Foreign Application Priority Data
Dec. 6, 2011  (JP) .................... 2011-266601

(51) Int. Cl.
| G06F 19/00 | (2011.01) |
| G06G 7/70 | (2006.01) |
| F02D 29/02 | (2006.01) |
| F02N 11/08 | (2006.01) |
| F02D 17/00 | (2006.01) |

(Continued)

(52) U.S. Cl.
CPC .............. *F02D 29/02* (2013.01); *B60W 10/06* (2013.01); *B60W 30/18072* (2013.01);
(Continued)

(58) Field of Classification Search
CPC .............. Y02T 10/48; F02N 11/0844; F02N 11/0818; F02N 11/0814; F02N 11/0855; F02N 2200/0801; F02N 2200/022; F02N 11/0822; F02N 11/0833; F02N 2200/102; F02D 41/042; F02D 29/02; F02D 17/00; B60W 30/18072; B60W 10/60; B60W 2050/0026; B60W 2520/10; B60W 2540/10; B60W 2540/12
USPC ............................................. 123/179.4, 325
See application file for complete search history.

(56) References Cited

U.S. PATENT DOCUMENTS

| 4,192,279 A | * | 3/1980 | Maisch | .................. F02D 17/04 |
| | | | | 123/179.1 |
| 6,190,284 B1 | * | 2/2001 | Kuroda | .................. B60K 6/485 |
| | | | | 123/179.4 |

(Continued)

FOREIGN PATENT DOCUMENTS

| EP | 2787201 A1 | 10/2014 |
| JP | 2002-221059 A | 8/2002 |

(Continued)

OTHER PUBLICATIONS

International Search Report for corresponding International Application No. PCT/JP2012/079803, mailed Feb. 19, 2013 (4 pages).

(Continued)

*Primary Examiner* — Sizo Vilakazi
(74) *Attorney, Agent, or Firm* — Osha Liang LLP

(57) ABSTRACT

A vehicle engine automatic control device has a brake operation amount detecting unit that detects an amount of brake operation by a driver, an engine stopping/re-starting unit that stops an engine when the amount of brake operation that is detected exceeds a first threshold during coast drive, and re-starts the engine when the amount of brake operation that is detected becomes equal to or lower than the first threshold after the engine stops, and a threshold setting unit that sets the first threshold smaller as a deceleration becomes lower.

16 Claims, 8 Drawing Sheets

(51) Int. Cl.
*B60W 30/18* (2012.01)
*B60W 10/06* (2006.01)
*B60W 50/00* (2006.01)

(52) U.S. Cl.
CPC .......... *F02D 17/00* (2013.01); *F02N 11/0818* (2013.01); *F02N 11/0822* (2013.01); *F02N 11/0833* (2013.01); *B60W 2050/0026* (2013.01); *B60W 2520/10* (2013.01); *B60W 2540/10* (2013.01); *B60W 2540/12* (2013.01); *F02N 2200/0801* (2013.01); *F02N 2200/102* (2013.01); *Y02T 10/48* (2013.01)

(56) References Cited

U.S. PATENT DOCUMENTS

| | | |
|---|---|---|
| 2002/0103055 A1 | 8/2002 | Tani et al. |
| 2011/0112740 A1* | 5/2011 | Hashimoto ............. F02D 17/02 701/70 |
| 2011/0132308 A1* | 6/2011 | Liu ..................... F02N 11/0855 123/179.4 |
| 2012/0208674 A1* | 8/2012 | Doering .............. F02D 41/0215 477/107 |
| 2014/0358406 A1* | 12/2014 | Mori ................... F02N 11/0822 701/112 |

FOREIGN PATENT DOCUMENTS

| | | |
|---|---|---|
| JP | 2003-35175 A | 2/2003 |
| JP | 2008-45446 A | 2/2008 |
| JP | 4374805 B2 | 9/2009 |
| WO | 2013/084690 A1 | 6/2013 |

OTHER PUBLICATIONS

Written Opinion for corresponding International Application No. PCT/JP2012/079803, mailed Feb. 19, 2013 (3 pages).

* cited by examiner

VEHICLE ENGINE AUTOMATIC CONTROL DEVICE AND VEHICLE ENGINE AUTOMATIC CONTROL METHOD

TECHNICAL FIELD

The present invention relates to an engine automatic control device that automatically stops and re-starts the engine while driving.

BACKGROUND ART

As a vehicle engine automatic control device, the technology described in JP4374805B has been disclosed. According to this device, even while the vehicle is driving, the engine is stopped when the amount of brake operation becomes equal to or greater than an engine stop determination threshold, to improve mileage, and the engine is re-started when the amount of brake operation becomes equal to or lower than an engine start determination threshold.

SUMMARY OF INVENTION

With the above conventional device, at and above a predetermined vehicle speed at which the vehicle is determined to be in a driving state, the engine (re-) start determination threshold is fixed regardless of the deceleration, and therefore there is a possibility that, while driving at a reduced speed before stopping the vehicle, the engine may be re-started against the driver's intention, and mileage cannot be improved sufficiently. For example, while driving at a reduced speed before stopping the vehicle, the amount of brake operation by the driver changes, and, shortly before stopping the vehicle, the deceleration tends to be made smaller and the amount of brake operation tends to be smaller so as to allow the vehicle to stop smoothly. However, if the engine start determination threshold is set regardless of the deceleration, there is a possibility that the amount of brake operation may readily become equal to or lower than the engine start determination threshold and the engine is re-started.

The present invention has been made focusing on the above problem, and it is therefore an object of the present invention to provide a vehicle engine automatic control device that can improve mileage better.

The vehicle automatic control device according to one embodiment has a brake operation amount detecting means configured to detect the amount of brake operation by the driver, an engine stopping/re-starting means configured to stop the engine when the amount of brake operation that is detected exceeds the first threshold during coast drive, and re-start the engine when the amount of brake operation that is detected becomes equal to or lower than the first threshold after the engine stops, and a threshold setting means configured to set the first threshold smaller as the deceleration lowers.

Embodiments of the present invention and advantages of the present invention will be described in detail below with reference to the accompanying drawings.

DESCRIPTION OF EMBODIMENTS

Embodiment 1

System Configuration

Figure 1:
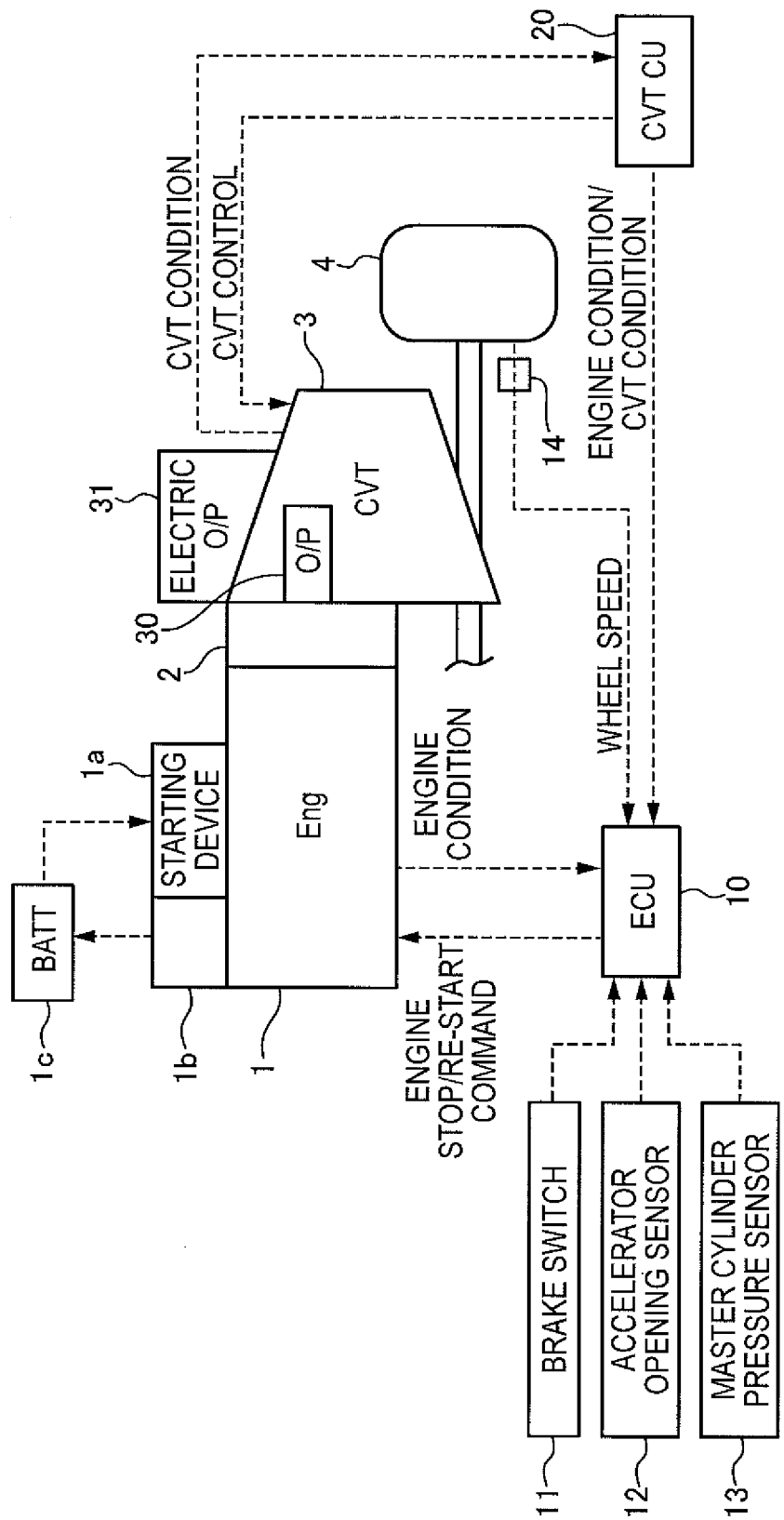
FIG. 1 is a system diagram showing a configuration of a vehicle engine automatic control device according to embodiment 1.

FIG. 1 is a system diagram showing a configuration of a vehicle engine automatic control device according to embodiment 1. On the output side of an engine 1, which is an internal combustion engine, a torque converter 2 is provided. To the output side of the torque converter 2, a belt-type continuously-variable transmission 3 is connected. Rotational driving force that is output from the engine 1 is input in the belt-type continuously-variable transmission 3 via the torque converter 2, and, after a gear change by a desired transmission ratio, transmitted to drive wheels 4.

The engine 1 has a starting device 1a that starts the engine, and an alternator 1b that generates power. In the starting device 1a, a starter motor is provided. Based on an engine start command, the starting device 1a drives the starter motor using power that is supplied from an in-vehicle battery 1c, and cranks the engine. Also, the starting device 1a injects fuel, and, after that, when the engine 1 becomes capable of self-sustaining rotation, stops the starter motor. The alternator 1b generates power by being allowed to rotate and drive by the engine 1, and supplies the generated power to the in-vehicle battery 1c and so on.

The torque converter 2 amplifies torque when the vehicle speed is low. The torque converter 2 also has a lockup clutch, and engages the lockup clutch and regulates the relative rotation between the output shaft of the engine 1 and the input shaft of the belt-type continuously-variable transmission 3 at and above a predetermined vehicle speed CSVSP (for example, approximately 14 km/h).

The belt-type continuously-variable transmission 3 is formed with a starter clutch, a primary pulley, a secondary pulley, and a belt that is provided to bridge over these pulleys, and achieves a desired transmission ratio by changing the pulley groove width with hydraulic pressure control. Also, in the belt-type continuously-variable transmission 3, an oil pump 30 to be driven by the engine 1 is provided. While the engine is working, this oil pump 30 serves as a hydraulic pressure source, supplies the converter pressure and the lockup clutch pressure of the torque converter 2, and also supplies the pulley pressure and the clutch engagement pressure of the belt-type continuously-variable transmission 3.

Furthermore, apart from the oil pump 30, an electric oil pump 31 is provided in the belt-type continuously-variable transmission (CVT) 3, and the electric oil pump 31 is configured to be able to activate and supply the required hydraulic pressure to each actuator when the engine automatically stops and the supply of hydraulic pressures by the oil pump 30 is not possible. Consequently, even when the engine is stopped, it is possible to compensate for leakage of the working oil, and also maintain the clutch engagement pressure.

The working conditions of the engine 1 are controlled by an engine control unit 10. In the engine control unit 10, a brake signal from a brake switch 11, which outputs ON signals in accordance with brake pedal operations by the driver, an accelerator signal from an accelerator pedal opening sensor 12, which detects the amount of accelerator pedal operation by the driver, a brake operation amount signal (master cylinder pressure) from a master cylinder pressure sensor 13, which detects the master cylinder pressure that is produced based on the amount of brake operation (the amount of brake pedal operation), the wheel speed from wheel speed sensors 14, which are provided in each wheel (the wheel speed is synonymous to a vehicle speed signal when the vehicle speed is detected from the wheel speed), a CVT condition signal from a CVT control unit 20, which will be described later, and signals representing the engine water temperature, the crank angle, the engine rotation speed and so on, are input. The engine control unit 10 executes the start or automatic stop of the engine 1, based on the variety of signals given above.

Note that it is equally possible to detect the driver's intention regarding braking operation by detecting the amount of brake operation using a sensor to detect the amount of brake pedal stroke and the force with which the brake pedal is stepped on, a sensor to detect the wheel cylinder pressure, and so on, instead of the master cylinder pressure sensor 13, and the master cylinder pressure sensor 13 is by no means limiting.

The CVT control unit 20 transmits and receives signals of the engine working conditions and the CVT conditions between the CVT control unit 20 and the engine control unit 10, and, based on these signals, controls the transmission ratio of the belt-type continuously-variable transmission 3 and so on. To be more specific, when a driving range is selected, the CVT control unit 20 engages the starter clutch, and, furthermore, determines the transmission ratio from a transmission ratio map based on the accelerator pedal opening and vehicle speed, and controls each pulley pressure. Also, although the CVT control unit 20 disengages the lockup clutch when the vehicle speed is lower than the predetermined vehicle speed CSVSP, when the vehicle speed is equal to or greater than the predetermined vehicle speed CSVSP, the CVT control unit 20 engages the lockup clutch to place the engine 1 and the belt-type continuously-variable transmission 3 in a directly coupled state. Furthermore, when the engine stops automatically while a driving range is selected, the CVT control unit 20 activates the electric oil pump 31 and secures the required hydraulic pressure.

[Engine Automatic Stop/Re-Start Control]

Next, the engine automatic stop control process will be described. The vehicle engine automatic control device (engine control unit 10) of present embodiment 1 stops engine idling when predetermined conditions hold (various conditions such as that the brake pedal is stepped on sufficiently) while the vehicle is stopped—that is, the engine automatic control device performs what may be referred to as idling stop control. Note that the idling stop control has only to implement public-domain configurations as appropriate, and therefore detailed descriptions thereof will be omitted. In addition, coast stop control, by which the engine 1 is stopped even while the vehicle is driving if the vehicle is decelerating and is decided to be highly likely to stop and shift to idling stop control via decelerating fuel cut control in the course of time, is executed. That is to say, in what may be referred to as the coast driving state (including the state in which the brake pedal is operated), in which the driver does not operate the accelerator pedal but the vehicle keeps driving by inertia, fuel injection is stopped.

During the decelerating fuel cut control, fuel injection is stopped, and, meanwhile, the engine rotation speed is maintained by the coast torque that is transmitted from the drive wheels 4, via the lockup clutch. However, since the lockup clutch is disengaged upon deceleration down to the predetermined vehicle speed CSVSP, the engine 1 stops unless fuel is injected. So, conventionally, at the time the lockup clutch is disengaged, decelerating fuel cut control is suspended, fuel injection is resumed, and the engine's self-sustaining rotation is maintained, and, furthermore, after the vehicle stops completely, engine idling is stopped. However, in the above step of, from the driving state in which fuel injection is stopped, resuming fuel injection once and then stopping the engine again in this way, mileage can be improved if the fuel upon resuming fuel injection can be reduced even more. So, the coast stop control according to present embodiment 1 is configured such that, when predetermined conditions hold, it is possible to keep the engine 1 stopped (without fuel injection and so on), without resuming fuel injection, and, after the vehicle stops, shift to normal idling stop control in the course of time.

One condition for executing coast stop control is that the amount of brake operation by the driver is within a predetermined range. The reason that the amount of brake operation is made one of the conditions is that coast stop control should be started or finished (suspended) based on the driver's intention of braking.

That is, when the amount of brake operation exceeds a lower limit threshold, it is possible to assume the driver's intention for braking, and, given that the vehicle is highly likely to stop and shift to idling stop control in the course of time, the engine 1 that is working is stopped and the coast stop control is started. After the coast stop control is started, if the amount of brake operation decreases and becomes equal to or lower than the lower limit threshold, it is possible to assume the driver's intention for not braking (intention to continue driving), and therefore the engine 1 that is stopped is re-started, and the coast stop control is finished (suspended).

Also, according to embodiment 1, to use as thresholds for the amount of brake operation for stopping/restarting the engine (for starting/finishing the coast stop control) while driving, not only the lower limit threshold is provided, but also an upper limit threshold, which is greater than the lower limit threshold, is provided. That is, even when the vehicle speed is lower than the predetermined vehicle speed CSVSP, the coast stop control is suspended if the amount of brake operation is equal to or greater than the upper limit threshold. Also, after the engine 1 is stopped, if the amount of brake operation increases and becomes equal to or greater than the upper limit threshold, the engine 1 that is stopped is re-started and the coast stop control is finished (suspended).

In this way, thresholds for the amount of brake operation, which serve as conditions to stop and re-start the engine 1, are provided separately between the higher side and the lower side of the amount of brake operation, such that the engine 1 is stopped when the amount of brake operation is within a predetermined range sandwiched between the above two thresholds (between the upper limit threshold and the lower limit threshold).

The upper limit threshold is provided for various reasons such as follows:

1. In a vehicle having a brake masterback that multiplies the force with which the brake pedal is operated by utilizing the negative pressure that is produced by the rotation of the engine 1, when the amount of brake operation increases while the engine is stopped, it is not possible to use the negative pressure produced by the rotation of the engine if the engine is kept stopped, and therefore there is a possibility that the driver's intended braking force cannot be achieved sufficiently.

2. When the brake pedal is stepped on hard, it is likely that the vehicle is decelerating rapidly and the time before the vehicle stops is short. At this time, it is necessary to make a gear change of the transmission ratio of the variable transmission (the belt-type continuously-variable transmission 3) to the low gear of the time of the start (the lowest side), before the vehicle stops (that is, while the drive wheels are rotating and the variable transmission is able to make gear changes). In a vehicle having a variable transmission that makes gear changes by utilizing the delivery pressure of the oil pump 30 that is driven by the engine 1, it is necessary to secure the amount of delivery of the oil pump 30 in order to make quick gear changes before the vehicle stops, as described above. Especially, gear changes with the belt-type continuously-variable transmission 3 require supply of comparatively high pulley pressures. Consequently, it is not preferable to stop the engine 1, which is the driving source of the oil pump 30. Note that, although it may be possible to change gears by hydraulic pressures to be supplied from the electric oil pump 31, it is necessary to make the electric oil pump 31 big in order to make gear changes quickly, and this is not desirable.

3. When the vehicle decelerates rapidly, various types of controls for stabilizing the vehicle's behavior may be involved. For example, according to ABS control for avoiding wheel lockup, to increase and decrease the brake liquid pressure that works on the wheels, the torque input from the engine 1 side is also taken into account to set various gains and so on in the control logic. Also, when the amount of slip is large, there is a possibility that the traction control system to reduce the engine torque and so on may be activated. Consequently, when the engine is stopped carelessly, influence upon these controls also becomes a concern.

Consequently, an engine stop determination threshold (the upper limit threshold BRKIN for the amount of brake operation to allow coast stop control) that takes into account the above circumstances (not necessarily all, and taking into account part of the above circumstances is also possible) is set, so that the engine 1 is stopped when the amount of brake operation falls below the upper limit threshold BRKIN, and is restarted when the amount of brake operation becomes equal to or greater than the upper limit threshold BRKIN.

The lower limit threshold will be discussed below. Upon soft deceleration in which the brake pedal is stepped on softly, the case of stopping the vehicle on an as-is basis and the case of releasing the brake pedal again and re-starting again, are possible. For example, when driving in a traffic jam, it may be possible to operate the brake pedal softly and still maintain the driving state. In this case, if the engine 1 is stopped carelessly, there is a possibility that it may be not possible to utilize the creep torque produced by the engine 1, and also that the engine keeps being stopped and re-started, and gives the driver a sense of discomfort.

Also, after the engine stops, if the engine is re-started while the brake pedal is kept stepped on softly, engine torque is output to the drive wheels, and this may give a jumpy feeling. Meanwhile, on an upward gradient, if the threshold for the amount of brake operation for re-starting the engine is too low, the engine is re-started after the braking force by the brake pedal becomes small, and therefore there is a possibility that the vehicle may move backward a little.

Furthermore, while driving at a reduced speed before stopping the vehicle, the amount of brake operation by the driver changes, and the amount of brake operation tends to be smaller as the vehicle speed becomes lower. For example, when the driver wants to stop the vehicle slowly such as when trying to stop for the red light, the brake liquid pressure that is required for deceleration becomes smaller as the vehicle speed lowers, so that the driver makes the amount of brake operation smaller. Here, if the engine 1 is re-started carelessly in accordance with the decrease of the amount of brake operation, the engine 1 is re-started against the driver's intention to stop the vehicle, and therefore there is a possibility that mileage cannot be improved sufficiently.

Consequently, an engine start determination threshold to take into account the above circumstances (the lower limit threshold BRKOUT for the amount of brake operation to allow coast stop control) is set, so that the engine 1 is stopped when the amount of brake operation exceeds the lower limit threshold BRKOUT, and is re-started when the amount of brake operation falls below the lower limit threshold BRKOUT.

Note that, in order to minimize switching between stopping the engine and re-starting the engine frequently, it may be possible to provide a hysteresis for each of the upper limit threshold BRKIN and the lower limit threshold BRKOUT.

[Engine Automatic Stop/Re-Start Control Process]

Figure 2:
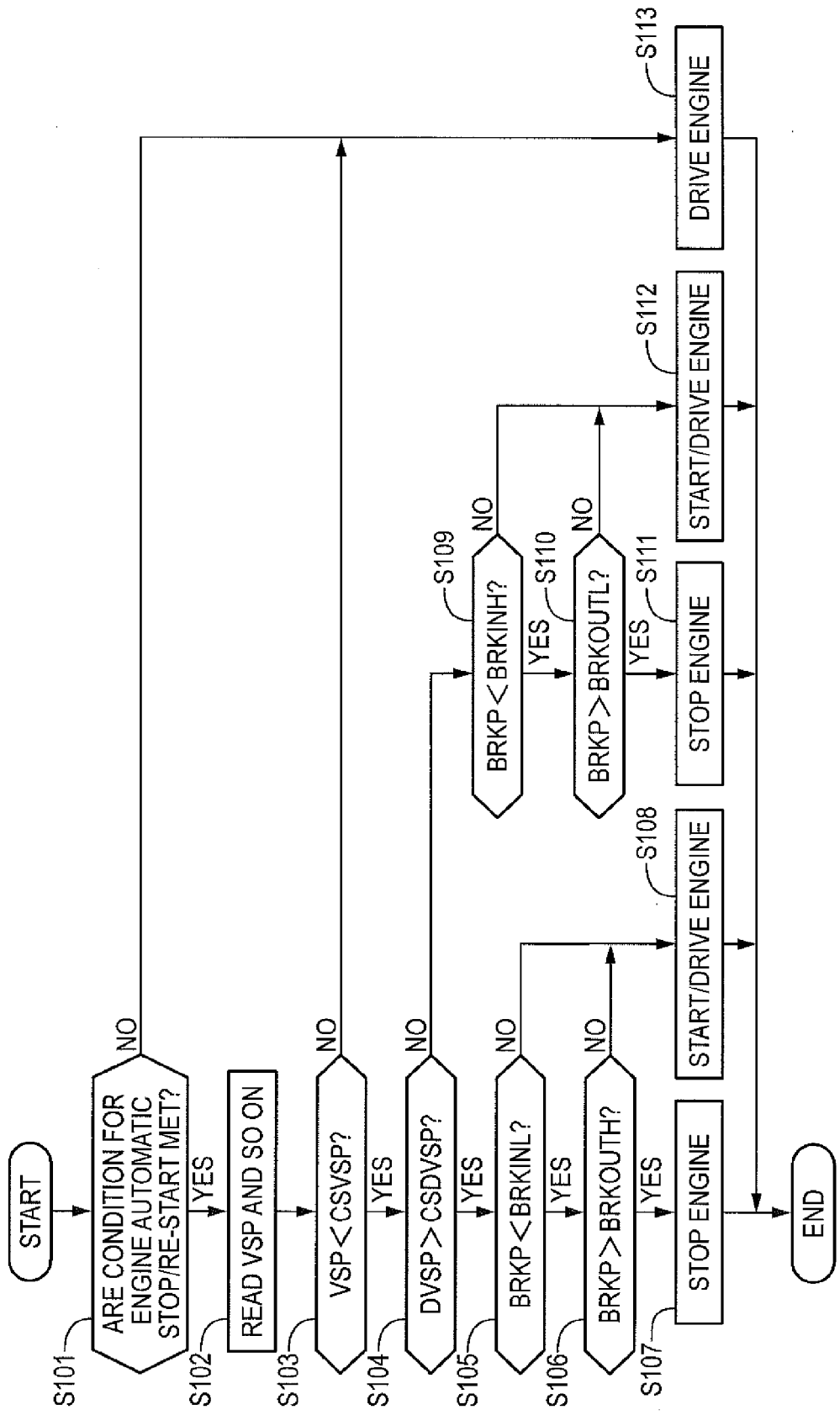
FIG. 2 is a flowchart showing an engine automatic stop/re-start control process according to embodiment 1.

FIG. 2 is a flowchart showing the engine automatic stop/re-start control process that is executed in the engine control unit 10 according to embodiment 1. This process is executed repeatedly per predetermined cycle while driving. Whether or not the vehicle is driving is decided based on, for example, whether the vehicle speed VSP is equal to or lower than a predetermined value VSP0, which represents the state in which the vehicle is stopped. The predetermined value VSP0 may be zero or may be in a very low vehicle speed range such as approximately 1 to 2 km/h, as long as the vehicle can be determined to be virtually stopped at that value. Note that other conditions that are not shown in this flowchart may be added and set as appropriate.

In step S101, whether or not the conditions to allow the engine automatic stop/re-start control are met—to be more specific, whether or not the coast driving state (in which the amount of accelerator pedal operation is zero) is assumed and whether or not the brake pedal is being operated—is decided. When the amount of accelerator pedal operation is zero and the brake pedal is being operated, the step moves on to step S102, and, otherwise, the step moves on to step S113 and the engine working conditions are retained.

In step S102, the vehicle speed VSP, the deceleration DVSP, the amount of brake operation (the master cylinder pressure) BRKP, the upper limit threshold (the idling stop allowing upper limit threshold) and lower limit threshold (the idling stop allowing lower limit threshold) for the amount of brake operation BRKP to allow idling stop control, and the upper limit threshold (the coast stop allowing upper limit threshold BRKIN) and lower limit threshold (the coast stop allowing lower limit threshold BRKOUT) for the amount of brake operation BRKP to allow coast stop control are read, and the step moves on to step S103.

The vehicle speed VSP may be an average value of each wheel speed detected by the wheel speed sensors 14, or may be an average value of the wheel speed of the driven wheels, and is not particularly limited.

The idling stop allowing upper limit threshold is a value that is set in advance in the system, and is assumed to be a fixed value in embodiment 1.

The coast stop allowing upper limit threshold BRKIN is set smaller as the deceleration DVSP increase. According to embodiment 1, to use as the coast stop allowing upper limit threshold BRKIN, there are a high deceleration range coast stop allowing upper limit threshold BRKINL to use when the deceleration DVSP is high (DVSP>CSDSP), and a low deceleration range coast stop allowing upper limit threshold BRKINH to use when the deceleration DVSP is low (DVSP≤CSDSP). The high deceleration range coast stop allowing upper limit threshold BRKINL is set to a smaller value than the low deceleration range coast stop allowing upper limit threshold BRKINH.

The coast stop allowing lower limit threshold BRKOUT is set larger as the deceleration DVSP increases. With embodiment 1, to use as the coast stop allowing lower limit threshold BRKOUT, there are a high deceleration range coast stop allowing lower limit threshold BRKOUTH to use when the deceleration DVSP is high (DVSP>CSDSP), and a low deceleration range coast stop allowing lower limit threshold BRKOUTL to use when the deceleration DVSP is low (DVSP≤CSDSP). The low deceleration range coast stop allowing lower limit threshold BRKOUTL is set to a smaller value than the high deceleration range coast stop allowing lower limit threshold BRKOUTH.

Note that the coast stop allowing upper limit thresholds BRKIN are set to be greater than the coast stop allowing lower limit thresholds BRKOUT, and the relationship BRKINH>BRKINL>BRKOUTH>BRKOUTL holds between these thresholds.

The idling stop allowing lower limit threshold is set to a greater value than the coast stop allowing lower limit thresholds BRKOUT. This is because the state in which idling stop is executed is the state in which the vehicle is stopped, and, if the engine is started in this state, although creep torque is output, given that the braking force by the brake is low in this state, there is a possibility that the vehicle might move unexpectedly due to this creep torque. Also, the state in which coast stop is made is one in which the vehicle is decelerating (that is, during drive), and, in this state, improving mileage as much as possible by stopping the engine is intended. Even if the engine 1 is re-started before the vehicle stops, as long as the vehicle is driving, the driver is little likely to feel a jumpy feeling due to creep torque.

In step S103, whether or not the vehicle speed VSP falls below the predetermined vehicle speed CSVSP for allowing stopping the engine is decided. When the vehicle speed VSP falls below the predetermined vehicle speed CSVSP, the step moves on to step S104, and, otherwise, the step moves on to step S113 and the engine working conditions are retained.

In step S104, whether or not the deceleration exceeds the predetermined deceleration CSDVSP is decided. When the deceleration exceeds the predetermined deceleration CSDVSP, the step moves on to step S105, and, otherwise, the step moves on to step S109.

In step S105, whether or not the amount of brake operation BRKP falls below the high deceleration range coast stop allowing upper limit threshold BRKINL is decided. When the amount of brake operation BRKP falls below the upper limit threshold BRKINL, the step moves on to step S106, and, otherwise, the step moves on to step S108, and the engine is started or the engine working conditions are retained.

In step S106, whether or not the amount of brake operation BRKP exceeds the high deceleration range coast stop allowing lower limit threshold BRKOUTH is decided. When the amount of brake operation BRKP exceeds the lower limit threshold BRKOUTH, the step moves on to step S107 and the engine is stopped, and, otherwise, the step moves on to step S108, and the engine is started or the engine working conditions are retained.

In step S109, whether or not the amount of brake operation BRKP falls below the low deceleration range coast stop allowing upper limit threshold BRKINH is decided. When the amount of brake operation BRKP falls below the upper limit threshold BRKINH, the step moves on to step S110, and, otherwise, the step moves on to step S112, and the engine is started or the engine working conditions are retained.

In step S110, whether or not the amount of brake operation BRKP exceeds the low deceleration range coast stop allowing lower limit threshold BRKOUTL is decided. When the amount of brake operation BRKP exceeds the lower limit threshold BRKOUTL, the step moves on to step S111 and the engine is stopped, and, otherwise, the step moves on to step S112, and the engine is started or the engine working conditions are retained.

[Operation]

Next, the operation based on the above control process will be described using comparative examples.

(When the Coast Stop Allowing Upper Limit Threshold/Lower Limit Threshold are Changed in Accordance with the Deceleration: Embodiment 1)

First, the operation of embodiment 1 will be described.

Figure 3:
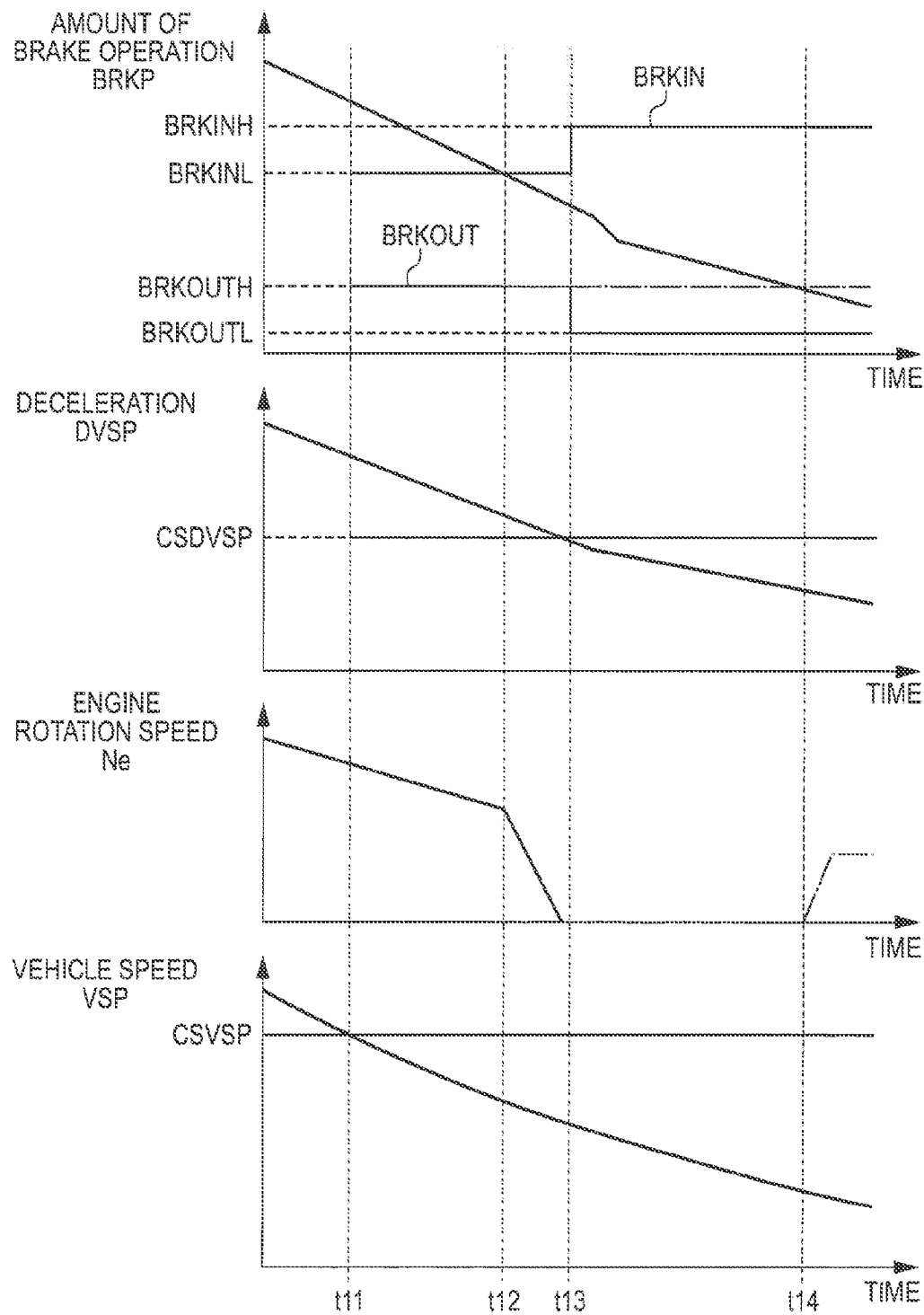
FIG. 3 provides time charts showing an operation of a process of setting coast stop allowing thresholds upon coast drive, according to embodiment 1.

FIG. 3 provides time charts showing the operation of the process of setting the coast stop allowing lower limit thresholds BRKOUT and coast stop allowing upper limit thresholds BRKIN upon coast drive, according to embodiment 1. In FIG. 3, the changes of the amount of brake operation BRKP, the deceleration DVSP, the engine rotation speed Ne, and the vehicle speed VSP are shown in order from the top. The driving conditions at the first time in this time chart (presumed conditions) assume the coast driving state, in which the driver's foot is released from the accelerator pedal while driving.

At and before time t11, the vehicle speed VSP is equal to or greater than the predetermined vehicle speed CSVSP. Consequently, the control process of FIG. 2 follows the flow of steps S101→S102→S103→S113, and the working conditions of the engine 1 are retained. Also, the amount of brake operation BRKP by the driver decreases gradually.

At time t11, the deceleration DVSP exceeds the predetermined deceleration CSDVSP, so that the high deceleration range coast stop allowing upper limit threshold BRKINL is selected for the coast stop allowing upper limit threshold BRKIN, and the high deceleration range coast stop allowing lower limit threshold BRKOUTH is selected for the coast stop allowing lower limit threshold BRKOUT. At this time, although the vehicle speed VSP becomes lower than the predetermined vehicle speed CSVSP, the amount of brake operation BRKP is equal to or higher than the high deceleration range coast stop allowing upper limit threshold BRKINL. Consequently, the control process of FIG. 2 follows the flow of steps S101→S102→S103→S104→S105→S108, and the working conditions of the engine 1 are retained.

At time t12, the amount of brake operation BRKP falls below the high deceleration range coast stop allowing upper limit threshold BRKINL but still is equal to or higher than the high deceleration range coast stop allowing lower limit threshold BRKOUTH. Consequently, the control process of FIG. 2 follows the flow of steps S101→S102→S103→S104→S105→S106→S107, and the engine 1 is stopped. After time t12 to start stopping the engine, the engine rotation speed decreases rapidly toward zero.

At time t13, the deceleration DVSP becomes equal to or lower than the predetermined deceleration CSDVSP, so that the low deceleration range coast stop allowing upper limit threshold BRKINH is selected for the coast stop allowing upper limit threshold BRKIN, and the low deceleration range coast stop allowing lower limit threshold BRKOUTL is selected for the coast stop allowing lower limit threshold BRKOUT. At and after this time t13, the amount of brake operation BRKP falls below the low deceleration range coast stop allowing upper limit threshold BRKINH but is equal to or greater than the low deceleration range coast stop allowing lower limit threshold BRKOUTL. Consequently, the control process of FIG. 2 follows the flow of steps S101→S102→S103→S104→S109→S110→S111, and the engine 1 is kept stopped.

(When the Coast Stop Allowing Lower Limit Threshold is Made a Fixed Value Regardless of the Deceleration: Comparative Example 1)

Next, the operation of comparative example 1, in which the coast stop allowing lower limit threshold BRKOUT is not changed in accordance with the deceleration DVSP and made a fixed value (for example, BRKOUTH), will be described. In comparative example 1, again, up to time t13, the same operation will apply as embodiment 1.

At time t13, the deceleration DVSP falls below the predetermined deceleration CSDVSP. However, even after time t13, the coast stop allowing lower limit threshold BRKOUT is set to the high deceleration range coast stop allowing lower limit threshold BRKOUTH, like up to time t13 (the one-dot chain line representing the amount of brake operation in FIG. 3).

At time t14, the amount of brake operation BRKP falls below the high deceleration range coast stop allowing lower limit threshold BRKOUTH, and therefore the engine 1 is re-started (the one-dot chain line representing the engine rotation speed in FIG. 3). Consequently, although, with the comparative example, the driver intends to stop the vehicle and it is possible to keep the engine stopped, the engine 1 is nevertheless re-started, and therefore it is not possible to improve mileage sufficiently.

By contrast with this, with embodiment 1, as described above, the coast stop allowing lower limit threshold BRKOUT is set smaller as the deceleration DVSP lowers. Consequently, even when the amount of brake operation changes in accordance with the deceleration DVSP, it is still possible to re-start the engine 1 in a more appropriate, timelier manner in accordance with the driver's intention, so that mileage can be improved better.

(When the Coast Stop Allowing Upper Limit Threshold is Made a Fixed Value Regardless of the Deceleration: Comparative Example 2)

Next, the operation of comparative example 2, in which the coast stop allowing upper limit threshold BRKIN is not changed in accordance with the vehicle speed DVSP and is made a fixed value (for example, BRKINH), will be described.

Figure 4:
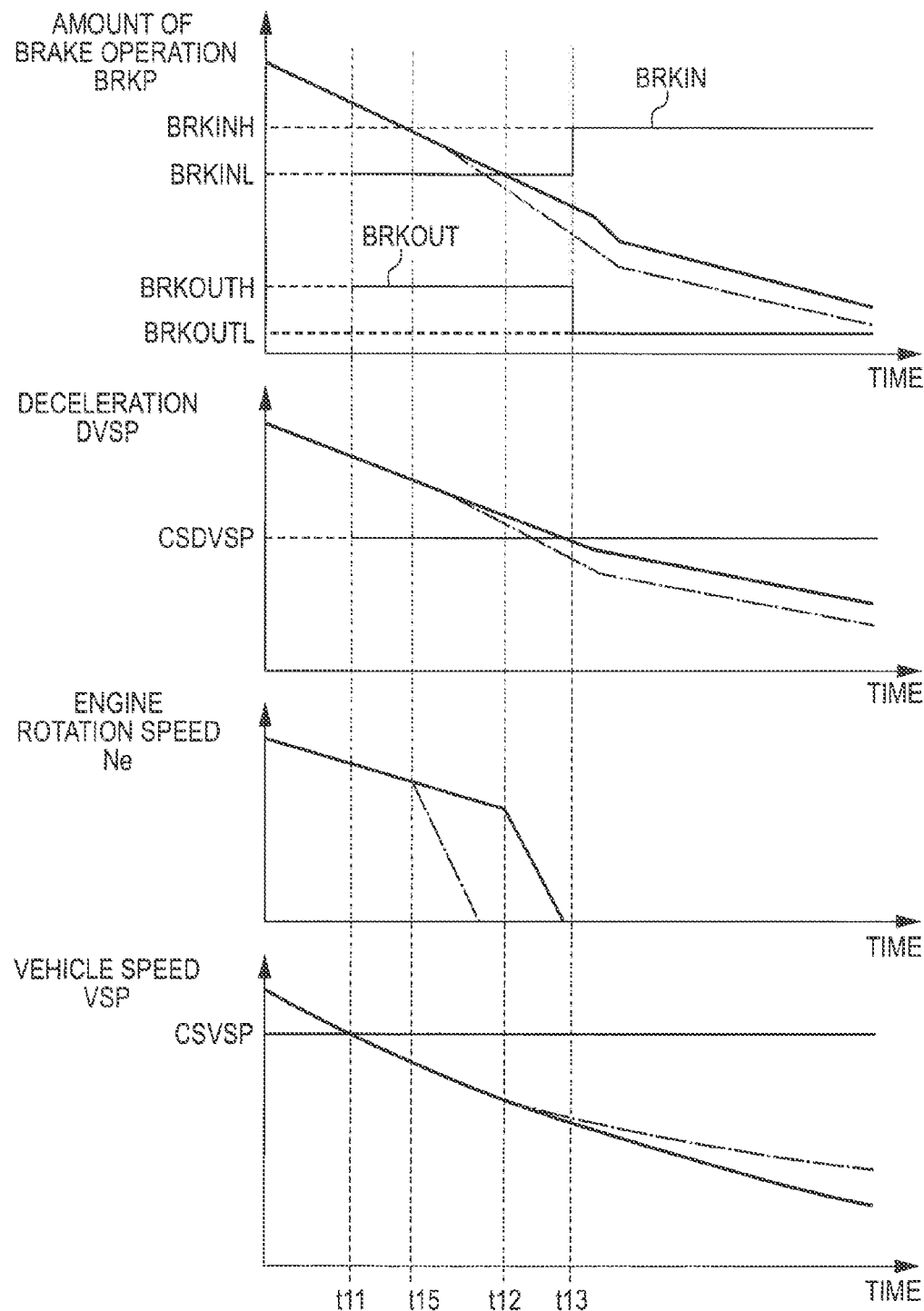
FIG. 4 provides time charts showing an operation of a process of setting coast stop allowing thresholds upon coast drive, according to embodiment 1.

FIG. 4 provides time charts showing the operation of the process of setting the coast stop allowing lower limit threshold BRKOUT and coast stop allowing upper limit threshold BRKIN upon coast drive, according to embodiment 1. In FIG. 4, the changes of the amount of brake operation BRKP, the deceleration DVSP, the engine rotation speed Ne, and the vehicle speed VSP are shown in order from the top. The operation of embodiment 1 shown in FIG. 4 is the same as in FIG. 3, and therefore its explanation will be omitted.

With comparative example 2, even if the deceleration DVSP up to time t13 is in a range equal to or greater than the predetermined deceleration CSDVSP, the low deceleration range coast stop allowing lower limit threshold BRKOUTH is set (the one-dot chain line representing the amount of brake operation in FIG. 4).

At time t15, the amount of brake operation BRKP falls below the low deceleration range coast stop allowing upper limit threshold BRKINH, so that the engine 1 is stopped. After time t15 to start stopping the engine, the engine rotation speed decreases rapidly toward zero (the one-dot chain line representing the engine rotation speed in FIG. 4). Since the engine 1 stops and the negative pressure by the rotation of the engine cannot be used, the reactive force of the brake pedal increases, and the amount of brake operation decreases (the one-dot chain line representing the amount of brake operation in FIG. 4). Consequently, the deceleration DVSP decreases (the one-dot chain line representing the deceleration in FIG. 4), and the driver's intended braking force cannot be achieved sufficiently (the one-dot chain line representing the vehicle speed in FIG. 4).

By contrast with this, with embodiment 1, as described above, the coast stop allowing upper limit threshold BRKIN is set smaller as the deceleration DVSP increases. Consequently, when the deceleration DVSP is high, the amount of brake operation is made little likely to enter the engine stop allowing range and the engine 1 is allowed to continue driving, so that braking force can be secured.

[Advantages]

As described above, with embodiment 1, the following advantages can be achieved.

(1) A master cylinder pressure sensor 13 (brake operation amount detecting means), which detects the amount of brake operation by the driver (the master cylinder pressure), and an engine control unit 10 (engine stopping/re-starting means, threshold setting means), which, during coast drive, stops the engine 1 when the amount of brake operation BRKP that is detected exceeds the lower limit threshold BRKOUT (the first threshold), and which, after the engine stops, re-starts the engine 1 when the amount of brake operation BRKP that is detected becomes equal to or lower than the lower limit threshold BRKOUT, are provided. The engine control unit 10 sets the lower limit threshold BRKOUT smaller as the deceleration DVSP lowers. Consequently, even when the amount of brake operation BRKP changes in accordance with the deceleration DVSP, it is still possible to re-start the engine 1 in a more appropriate, timelier manner in accordance with the driver's intention, so that mileage can be improved better.

(2) The engine control unit 10 is configured such that, during coast drive, the engine 1 is stopped when the amount of brake operation BRKP that is detected falls below the upper limit threshold BRKIN (the second threshold), which is greater than the lower limit threshold BROUT, and, when the amount of brake operation BRKP that is detected is equal to or greater than the upper limit threshold BRKIN, the engine 1 is driven, and the upper limit threshold BRKIN is set smaller as the deceleration DVSP increases. Consequently, when the deceleration DVSP is high, the amount of brake operation BRKP is made little likely to enter the engine stop allowing range and the engine 1 is allowed to continue driving, so that braking force can be secured.

Embodiment 2

Next, embodiment 2 will be described. The basic configuration is the same as embodiment 1, so that the different points alone will be described.

Figure 5:
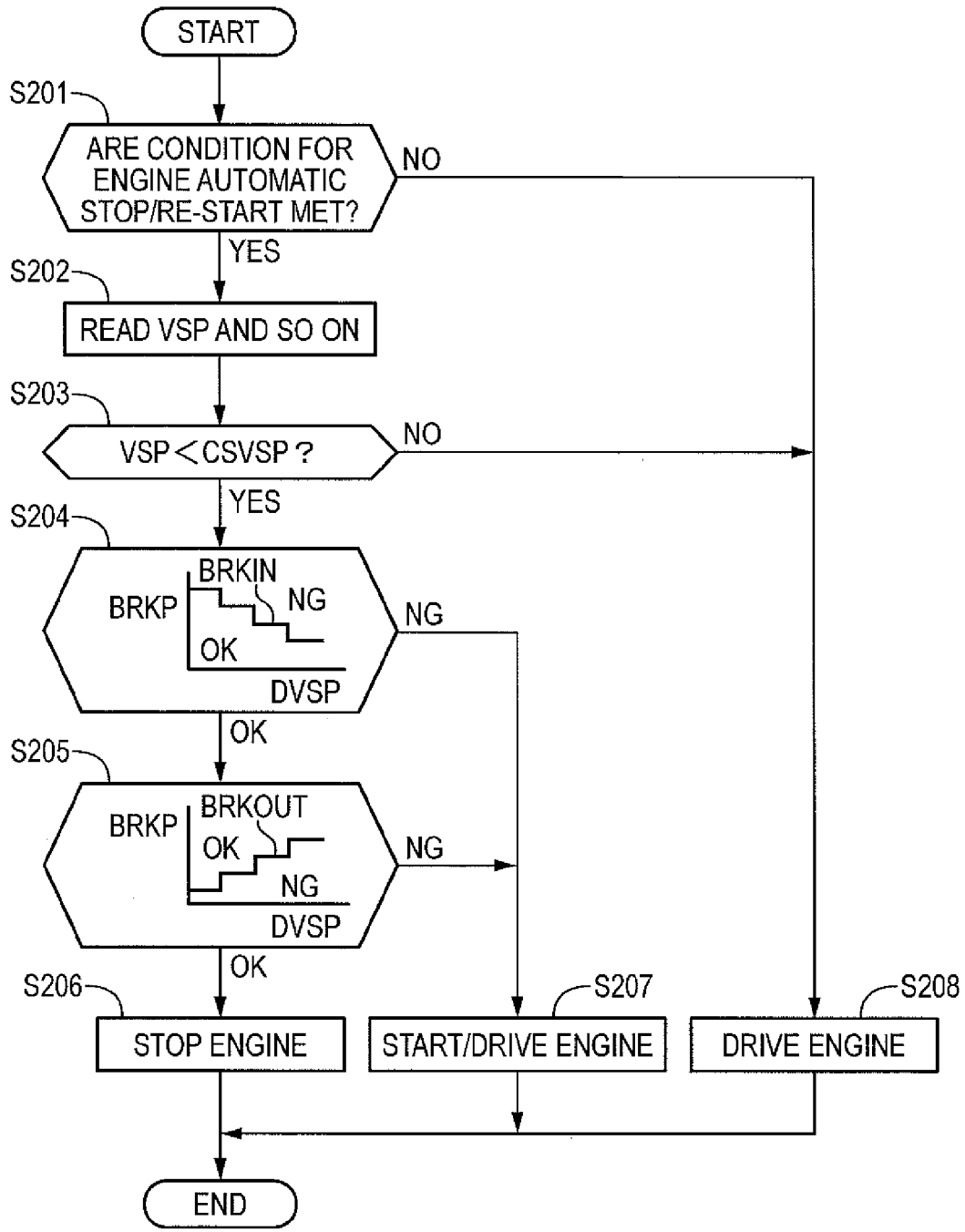
FIG. 5 is a flowchart showing an engine automatic stop/re-start control process according to embodiment 2.

FIG. 5 is a flowchart showing the engine automatic stop/re-start control process that is executed in the engine control unit 10 according to embodiment 2. In embodiment 2, the coast stop allowing upper limit threshold BRKIN is set smaller as the deceleration DVSP increases, and the coast stop allowing lower limit threshold BRKOUT is set smaller as the deceleration DVSP lowers. The engine control unit 10 has a map 1 to show the relationship between the coast stop allowing upper limit threshold BRKIN and the deceleration DVSP, and a map 2 to show the relationship between the coast stop allowing lower limit threshold BRKOUT and the deceleration DVSP.

In the map 1, as shown in step S204 of FIG. 5, a border line is drawn such that the coast stop allowing upper limit threshold BRKIN decreases stepwise (in steps) as the deceleration DVSP changes from the lower side to the higher side. The area where the amount of brake operation is smaller than this border line is defined as the coast stop allowing (OK) area, and the area where the amount of brake operation is greater than the border line is defined as the coast stop disallowing (NG) area. Whether to allow or disallow coast stop (engine stop) is decided based on which area the driving conditions as of then (the deceleration DVSP and the amount of brake operation BRKP) belong to.

In the map 2, as shown in step S205 of FIG. 5, a border line is drawn such that the coast stop allowing lower limit threshold BRKOUT increases stepwise (in steps) as the deceleration DVSP changes from the lower side to the higher side. The area where the amount of brake operation is greater than this border line is defined as the coast stop allowing (OK) area, and the area where the amount of brake operation is lower than the border line is defined as the coast stop disallowing (NG) area. Whether to allow or disallow coast stop (engine stop) is decided based on which area the driving conditions as of then (the deceleration DVSP and the amount of brake operation BRKP) belong to.

[Engine Automatic Stop/Re-Start Control Process]

The process shown in FIG. 5 is executed repeatedly per predetermined cycle while driving. Whether or not the vehicle is driving is decided based on, for example, whether the vehicle speed VSP is equal to or lower than a predetermined value VSP0, which represents the state in which the vehicle is stopped. The predetermined value VSP0 may be zero or may be in a very low vehicle speed range such as approximately 1 to 2 km/h, as long as the vehicle can be determined to be virtually stopped at that value. Note that other conditions that are not shown in this flowchart may be added and set as appropriate.

In step S201, whether or not the conditions to allow the engine automatic stop/re-start control are met—to be more specific, whether or not conditions such as that the coast driving state is assumed and also the brake pedal is being operated are met—is decided. When the allowing conditions are met, the step moves on to step S302, and, otherwise, the step moves on to step S208 and the engine working conditions are retained.

In step S202, the vehicle speed VSP, the deceleration DVSP, the amount of brake operation (the master cylinder pressure) BRKP, the upper limit threshold and lower limit threshold for the amount of brake operation BRKP to allow idling stop control, and the maps 1 and 2 are read, and the step moves on to step S203.

In step S203, whether or not the vehicle speed VSP falls below the predetermined vehicle speed CSVSP to allow the engine to be stopped, is decided. When the vehicle speed VSP falls below the predetermined vehicle speed CSVSP, the step moves on to step S204, and, otherwise, the step moves on to step S208 and the engine working conditions are retained.

In step S204, which one of the coast stop allowing area and the coast stop disallowing area of the map 1 the driving conditions as of then (the deceleration DVSP and the amount of brake operation BRKP) belong to, is decided. When the driving conditions as of then are decided to belong to the coast stop allowing area, the step moves on to step S205, and, when the driving conditions as of then are decided to belong to the coast stop disallowing area, the step moves on to step S207, and the engine is started or the engine working conditions are retained.

In step S205, which one of the coast stop allowing area and the coast stop disallowing area of the map 2 the driving conditions as of then (the deceleration DVSP and the amount of brake operation BRKP) belong to, is decided. When the driving conditions as of then are decided to belong to the coast stop allowing area, the step moves on to step S206 and the engine is stopped, and, when the driving conditions as of then are decided to belong to the coast stop disallowing area, the step moves on to step S207 and the engine is started or the engine working conditions are retained.

[Operation]

Figure 6:
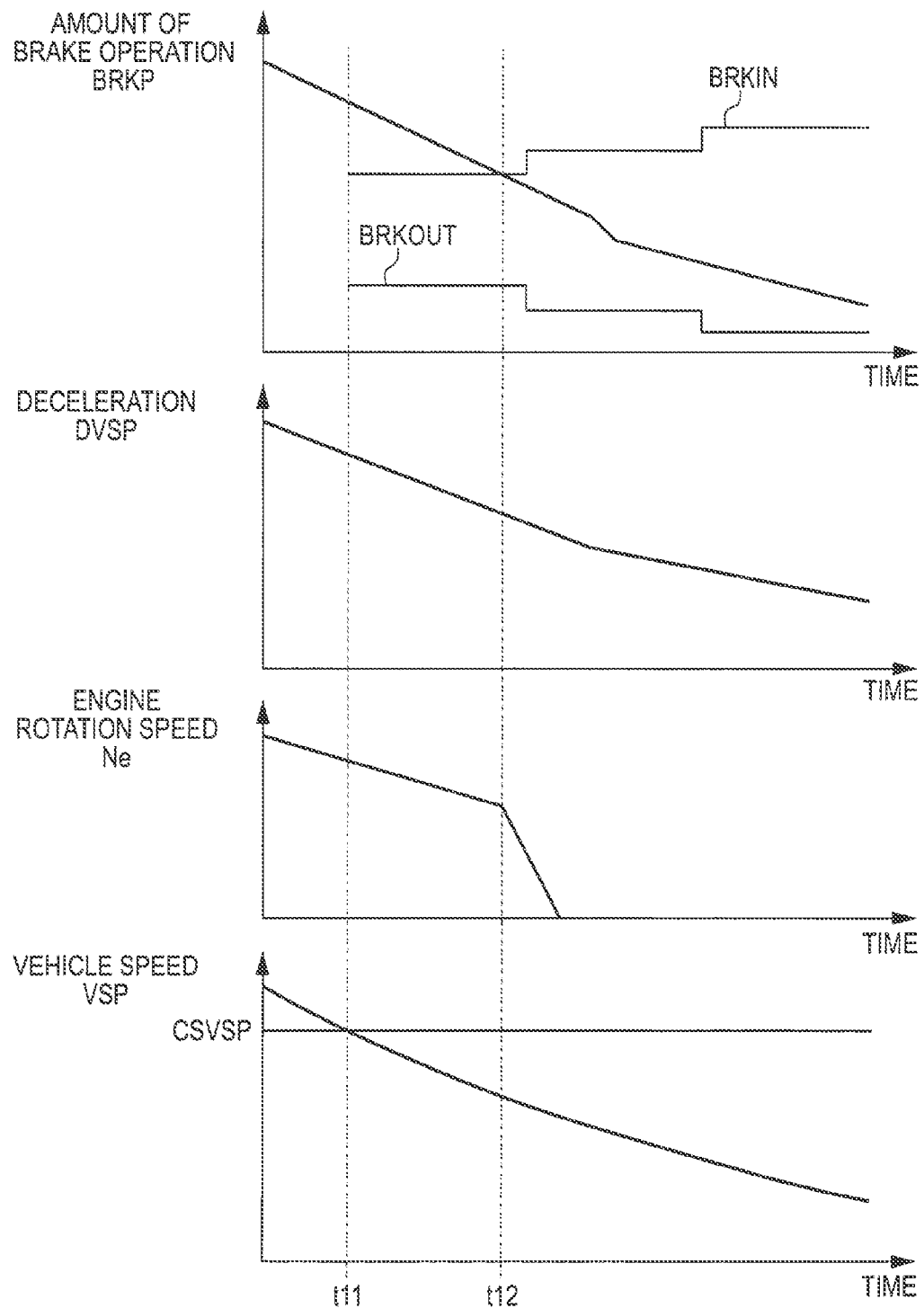
FIG. 6 provides time charts showing an operation of a process of setting coast stop allowing thresholds upon coast drive, according to embodiment 2.

Next, the operation based on the above control process will be described. FIG. 6 provides time charts showing the operation of the process of setting the coast stop allowing upper limit threshold BRKIN and lower limit threshold BRKOUT upon coast drive according to embodiment 2. In FIG. 6, the changes of the amount of brake operation BRKP, the deceleration DVSP, the engine rotation speed Ne, and the vehicle speed VSP are shown in order from the top.

At and before time t11, the vehicle speed VSP is equal to or greater than the predetermined vehicle speed CSVSP. Consequently, the control process of FIG. 5 follows the flow of steps S201→S202→S203→S208, and the working conditions of the engine 1 are retained. Also, the amount of brake operation BRKP by the driver decreases gradually.

At time t11, the vehicle speed VSP becomes lower than the predetermined vehicle speed CSVSP, the conditions to allow the engine automatic stop/re-start control are met. Also, the driving conditions (the deceleration DVSP and the amount of brake operation BRKP) belong to the coast stop disallowing area in the map 1. Consequently, the control process of FIG. 5 follows the flow of steps S201→S202→S203→S204→S207, and the working conditions of the engine 1 are retained.

After this, in accordance with the decrease of the deceleration DVSP, the coast stop allowing upper limit threshold BRKIN in the map 1 increases stepwise (in steps), and the lower limit threshold BRKOUT in the map 2 decreases stepwise (in steps).

At time t12, the working conditions (the deceleration DVSP and the amount of brake operation BRKP) belong to the coast stop allowing area in the map 1 and also belong to the coast stop allowing area in the map 2. Consequently, the steps follow the flow of steps S201→S202→S203→

S204→S205→S207, and the engine 1 (fuel injection) is stopped. After time t12 to start stopping the engine, the engine rotation speed decreases rapidly toward zero.

With embodiment 2, a plurality of coast stop allowing lower limit thresholds BRKOUT are set such that the coast stop allowing lower limit threshold BRKOUT becomes smaller as the deceleration DVSP lowers. To be more specific, three or more coast stop allowing lower limit thresholds BRKOUT are set, unlike embodiment 1 (in which two of the high deceleration range coast stop allowing lower limit threshold BRKOUTH and the low deceleration range coast stop allowing lower limit threshold BRKOUTL are set). In this way, by breaking down more finely and setting the coast stop allowing lower limit thresholds BRKOUT in accordance with the deceleration DVSP, it is possible to prevent the coast stop allowing lower limit thresholds BRKOUT from changing rapidly, and re-start the engine 1 in a more appropriate, timelier manner. Consequently, mileage can be improved better.

Also, the coast stop allowing lower limit thresholds BRKOUT are set based on the map 2. Consequently, it is possible to improve the flexibility with the setting of the coast stop allowing lower limit thresholds BRKOUT. Also, it is possible to alleviate the calculation load of the engine control unit 10 compared to the case where, for example, the coast stop allowing lower limit thresholds BRKOUT are set based on algorithms.

Also, a plurality of coast stop allowing upper limit thresholds BRKIN are set such that the coast stop allowing upper limit threshold BRKIN becomes greater as the deceleration DVSP lowers. To be more specific, three or more coast stop allowing upper limit thresholds BRKIN are set unlike embodiment 1 (in which two of the high deceleration range coast stop allowing upper limit threshold BRKINL and the low deceleration range coast stop allowing upper limit threshold BRKINH are set). In this way, by breaking down more finely and setting the coast stop allowing upper limit thresholds BRKIN in accordance with the deceleration DVSP, it is possible to prevent the coast stop allowing upper limit thresholds BRKIN from changing rapidly, and re-start the engine 1 in a more appropriate, timelier manner. Consequently, it is possible to improve the braking performance of the vehicle and the transmission controllability of the belt-type continuously-variable transmission 3 more. Also, by setting the coast stop allowing upper limit thresholds BRKIN based on the map 1, it is possible to alleviate the calculation load of the engine control unit 10 and also improve the flexibility with the setting of the coast stop allowing upper limit thresholds BRKIN.

[Advantages]

As described above, with embodiment 2, the following advantages can be achieved.

(3) The engine control unit 10 sets a plurality of lower limit thresholds such that the lower limit threshold BRKOUT becomes smaller as the deceleration DVSP lowers. Consequently, it is possible to re-start the engine 1 in a more appropriate, timelier manner, so that mileage can be improved better.

(4) The engine control unit 10 sets the lower limit thresholds BRKOUT based on a predetermined map. Consequently, it is possible to improve the flexibility of the setting of the coast stop allowing lower limit thresholds BRKOUT.

(5) The engine control unit 10 sets a plurality of upper limit thresholds BRKIN such that the upper limit threshold BRKIN becomes smaller as the deceleration DVSP increases. Consequently, the engine is kept working until a more appropriate time, so that it is possible to secure braking force.

(6) The engine control unit 10 sets the upper limit thresholds BRKIN based on a predetermined map. Consequently, it is possible to improve the flexibility of the setting of the coast stop allowing upper limit thresholds BRKIN.

Embodiment 3

Figure 7:
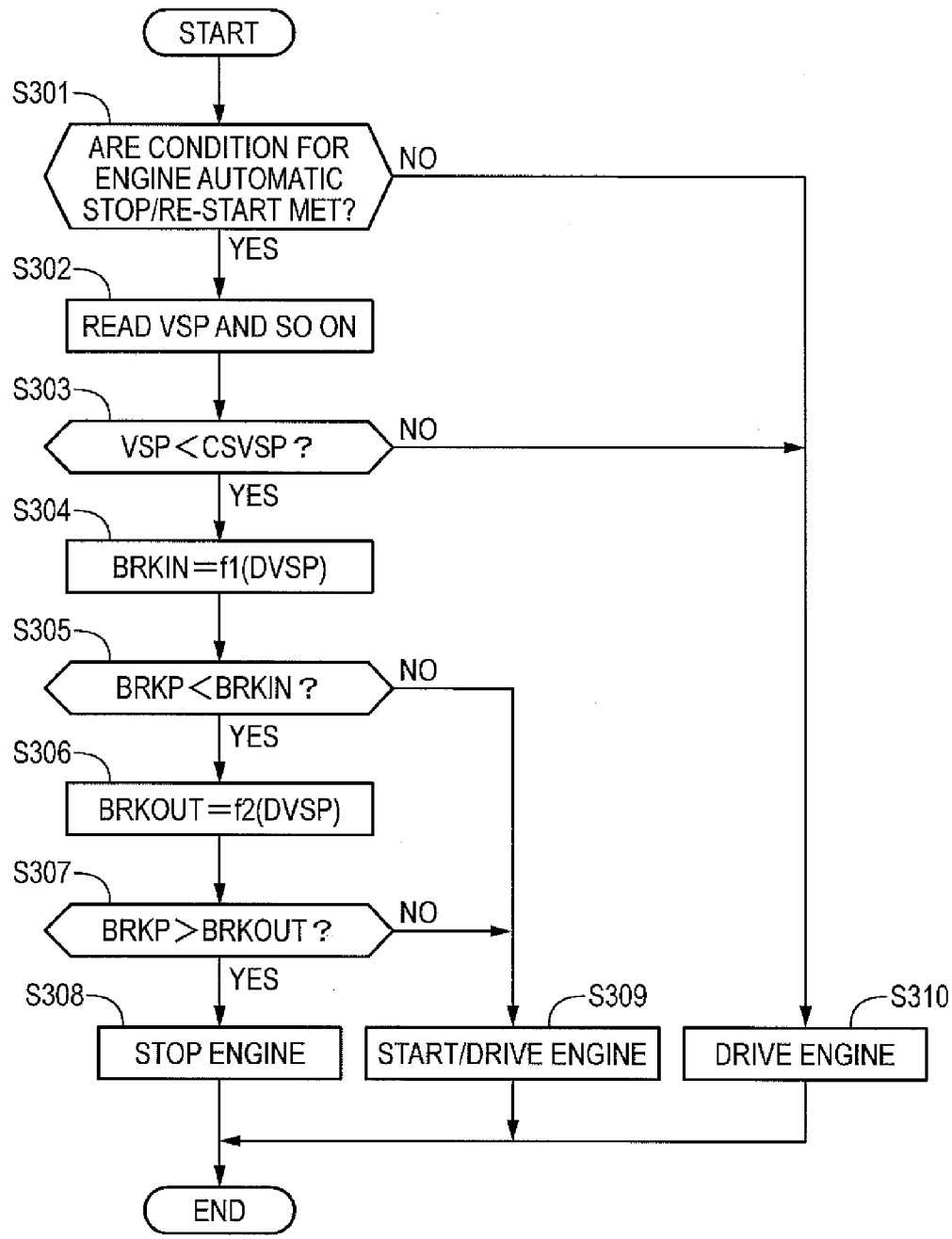
FIG. 7 is a flowchart showing an engine automatic stop/re-start control process according to embodiment 3.

Next, embodiment 3 will be described. The basic configuration is the same as embodiments 1 and 2, so that the different points alone will be described. FIG. 7 is a flowchart showing the engine automatic stop/re-start control process executed in the engine control unit 10 according to embodiment 3.

The engine control unit 10 calculates the coast stop allowing upper limit threshold BRKIN and lower limit threshold BRKOUT based on the deceleration DVSP, using an algorithm 1, by which the coast stop allowing upper limit threshold BRKIN is calculated greater as the deceleration DVSP lowers, and an algorithm 2, by which the coast stop allowing lower limit threshold BRKOUT is calculated greater as the deceleration DVSP increases. The algorithms 1 and 2 are able to, for example, allow such properties that the upper limit threshold BRKIN or the lower limit threshold BRKOUT changes linearly in accordance with changes of the deceleration DVSP.

[Engine Automatic Stop/Re-Start Control Process]

The process shown in FIG. 7 is executed repeatedly per predetermined cycle while driving. Whether or not the vehicle is driving is decided based on, for example, whether the vehicle speed VSP is equal to or lower than a predetermined value VSP0, which represents the state in which the vehicle is stopped. The predetermined value VSP0 may be zero or may be in a very low vehicle speed range such as approximately 1 to 2 km/h, as long as the vehicle can be determined to be virtually stopped at that value. Note that other conditions that are not shown in this flowchart may be added and set as appropriate.

In step S301, whether or not the conditions to allow the engine automatic stop/re-start control are met—to be more specific, whether or not conditions such as that the coast driving state is assumed and also the brake pedal is being operated are met—is decided. When the allowing conditions are met, the step moves on to step S302, and, otherwise, the step moves on to step S310, and the engine working conditions are retained.

In step S302, the vehicle speed VSP, the amount of brake operation BRKP (master cylinder pressure), and the upper limit threshold and lower limit threshold for the amount of brake operation BRKP to allow idling stop control are read, and the step moves on to step S303.

In step S303, whether or not the vehicle speed VSP falls below the predetermined vehicle speed CSVSP for allowing the engine to be stopped, is decided. When the vehicle speed VSP falls below the predetermined vehicle speed CSVSP, the step moves on to step S304, and, otherwise, the step moves on to step S310 and the engine working conditions are retained.

In step S304, the coast stop allowing upper limit threshold BRKIN is calculated based on the deceleration DVSP and the algorithm 1, and the step moves on to step S305.

In step S305, whether or not the amount of brake operation BRKP falls below the coast stop allowing upper limit threshold BRKIN that is calculated, is decided. When the amount of brake operation BRKP is decided to fall below the coast stop allowing upper limit threshold BRKIN, the step moves on to step S306, and, when the amount of brake operation BRKP is decided to be equal to or greater than the coast stop allowing upper limit threshold BRKIN, the step moves on to step S309, and the engine is started or the engine working conditions are retained.

In step S306, the coast stop allowing lower limit threshold BRKOUT is calculated based on the deceleration DVSP and the algorithm 2, and the step moves on to step S307.

In step S307, whether or not the amount of brake operation BRKP exceeds the coast stop allowing lower limit threshold BRKOUT that is calculated is decided. When the amount of brake operation BRKP is decided to exceed the coast stop allowing lower limit threshold BRKOUT, the step moves on to step S308, and, when the amount of brake operation BRKP is decided to be equal to or lower than the coast stop allowing lower limit threshold BRKOUT, the step moves on to step S309, and the engine is started or the engine working conditions are retained.

[Operation]

Figure 8:
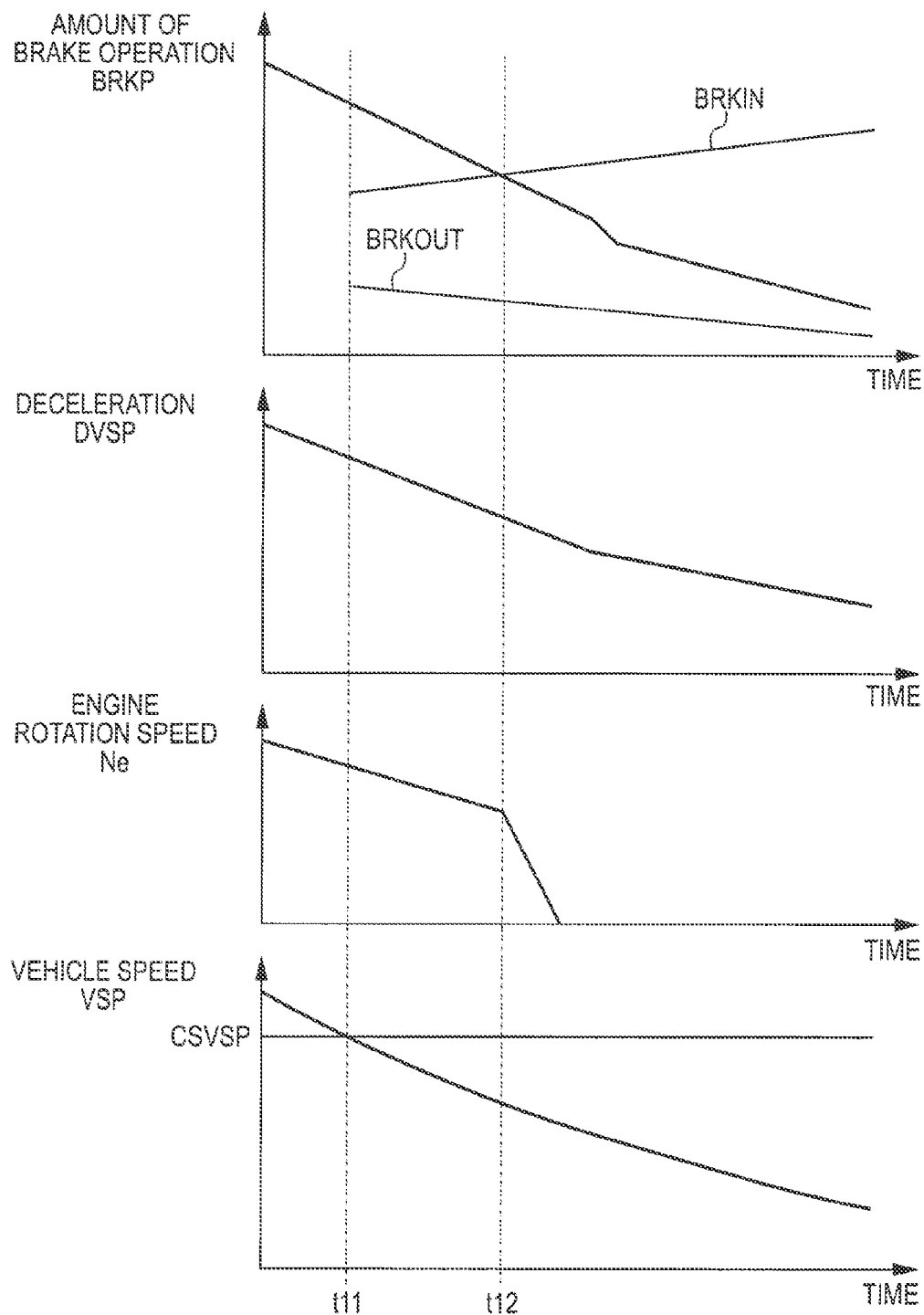
FIG. 8 provides time charts showing an operation of a process of setting coast stop allowing thresholds upon coast drive, according to embodiment 3.

Next, the operation based on the above control process will be described. FIG. 8 provides time charts showing the operation of the process of setting the coast stop allowing upper limit threshold BRKIN and lower limit threshold BRKOUT upon coast drive according to embodiment 3. In FIG. 8, the changes of the amount of brake operation BRKP, the deceleration DVSP, the engine rotation speed Ne, and the vehicle speed VSP are shown in order from the top.

At and before time t11, the vehicle speed VSP is equal to or greater than the predetermined vehicle speed CSVSP. Consequently, the control process of FIG. 8 follows the flow of steps S301→S302→S303→S310, and the working conditions of the engine 1 are retained. Also, the amount of brake operation BRKP by the driver decreases gradually.

At time t11, the vehicle speed VSP becomes lower than the predetermined vehicle speed CSVSP, and the conditions to allow the engine automatic stop/re-start control are met. At this time, the amount of brake operation BRKP exceeds the coast stop allowing upper limit threshold BRKIN that is calculated from the vehicle speed VSP and the algorithm 1. Consequently, the steps follow the flow of steps S301→S302→S303→S304→S305→S309, and the working conditions of the engine 1 are retained. After that, in accordance with the decrease of the deceleration DVSP, the coast stop allowing upper limit threshold BRKIN in the algorithm 1 increases linearly, and the lower limit threshold BRKOUT in the algorithm 2 decreases linearly.

At time t12, the amount of brake operation BRKP falls below the coast stop allowing upper limit threshold BRKIN that is calculated from the deceleration DVSP and the algorithm 1, and also exceeds the coast stop allowing lower limit threshold BRKOUT that is calculated from the deceleration DVSP and the algorithm 2. Consequently, the steps follow the flow of steps S301→S302→S303→S304→S305→S306→S307→S308, and the engine is stopped. After time t12 to stop the engine, the engine rotation speed decreases rapidly toward zero.

With embodiment 3, the coast stop allowing upper limit threshold BRKIN and the coast stop allowing lower limit threshold BRKOUT are set based on the algorithm 1 and the algorithm 2, respectively. Consequently, compared to the case where, for example, the upper limit threshold BRKIN and the lower limit threshold BRKOUT are set using maps, it is possible to reduce the amount of data to store in the engine control unit 10. That is, when trying to break down more finely and set the upper limit threshold BRKIN and the lower limit threshold BRKOUT in accordance with the deceleration DVSP, although using maps might result in an increased amount of data, using algorithms makes it possible to minimize the increase of the amount of data.

[Advantages]

As described above, with embodiment 3, the following advantages can be achieved.

(7) The engine control unit 10 sets the lower limit threshold BRKOUT based on a predetermined algorithm. Consequently, it is possible to reduce the amount of data that is stored.

(8) The engine control unit 10 sets the upper limit threshold BKRIN based on a predetermined algorithm. Consequently, it is possible to reduce the amount of data that is stored.

OTHER EMBODIMENTS

Although the present invention has been described based on embodiment 1 to embodiment 3, the above embodiments are by no means limiting, and other configurations may be covered by the present invention as well. For example, although examples to employ a belt-type continuously-variable transmission have been illustrated with embodiment 1 to embodiment 3, configurations to have other automatic stepwise variable transmissions, manual variable transmissions and so on may be used as well. Also, although examples to have a torque converter have been illustrated, vehicles without a torque converter are also applicable. In these cases, as parameters of the conditions to allow coast stop control (engine automatic stop), other parameters (the combination of the vehicle speed and the transmission ratio, the engine rotation speed, and so on) to indicate whether or not it is possible to maintain the self-sustaining rotation of the engine may be used, instead of the predetermined vehicle speed CSVSP.

Also, with embodiment 1 and embodiment 2, the deceleration DVSP to serve as the threshold for changing the coast stop allowing upper limit threshold BRKIN does not have to be the same as the deceleration DVSP to serve as the threshold for changing the coast stop allowing lower limit threshold BRKOUT, and both decelerations DVSP may be made different.

This application claims priority based on Japanese Patent Application No. 2011-266601, filed with the Japan Patent Office, on Dec. 6, 2011, the entire contents of which are expressly incorporated herein by reference.

The invention claimed is:

1. A vehicle engine automatic control device, comprising: a brake operation amount detecting unit that is configured to detect an amount of brake operation by a driver; an engine stopping/re-starting unit that is configured to stop an engine when the amount of brake operation that is detected exceeds a first threshold during coast drive, and re-starts the engine when the amount of brake operation that is detected becomes equal to or lower than the first threshold after the engine stops; and a threshold setting unit that is configured to set the first threshold smaller as a deceleration becomes lower.

2. The vehicle engine automatic control device according to claim 1, wherein the threshold setting unit sets a plurality of first thresholds such that the first threshold becomes smaller as the deceleration becomes lower.

3. The vehicle engine automatic control device according to claim 1, wherein the threshold setting unit sets the first threshold based on a predetermined map.

4. The vehicle engine automatic control device according to claim 1, wherein the threshold setting unit sets the first threshold based on a predetermined algorithm.

5. The vehicle engine automatic control device according to claim 1,
- wherein the engine stopping/re-starting unit, during coast drive, stops the engine when the amount of brake operation that is detected falls below a second threshold, which is greater than the first threshold, and drives the engine when the amount of brake operation that is detected is equal to or greater than the second threshold; and
- wherein the threshold setting unit sets the second threshold smaller as the deceleration increases.

6. The vehicle engine automatic control device according to claim 5, wherein the threshold setting unit sets a plurality of second thresholds such that the second threshold becomes smaller as the deceleration increases.

7. The vehicle engine automatic control device according to claim 5, wherein the threshold setting unit sets the second threshold based on a predetermined map.

8. The vehicle engine automatic control device according to claim 5, wherein the threshold setting unit sets the second threshold based on a predetermined algorithm.

9. A vehicle engine automatic control method, comprising:
- detecting an amount of brake operation by a driver;
- stopping an engine when the amount of brake operation that is detected exceeds a first threshold during coast drive;
- re-starting the engine when the amount of brake operation that is detected becomes equal to or lower than the first threshold after the engine stops; and
- setting the first threshold smaller as a deceleration becomes lower.

10. The vehicle engine automatic control device according to claim 2, wherein the threshold setting unit sets the first threshold based on a predetermined map.

11. The vehicle engine automatic control device according to claim 2, wherein the threshold setting unit sets the first threshold based on a predetermined algorithm.

12. The vehicle engine automatic control device according to claim 2,
- wherein the engine stopping/re-starting unit, during coast drive, stops the engine when the amount of brake operation that is detected falls below a second threshold, which is greater than the first threshold, and drives the engine when the amount of brake operation that is detected is equal to or greater than the second threshold; and
- wherein the threshold setting unit sets the second threshold smaller as the deceleration increases.

13. The vehicle engine automatic control device according to claim 3,
- wherein the engine stopping/re-starting unit, during coast drive, stops the engine when the amount of brake operation that is detected falls below a second threshold, which is greater than the first threshold, and drives the engine when the amount of brake operation that is detected is equal to or greater than the second threshold; and
- wherein the threshold setting unit sets the second threshold smaller as the deceleration increases.

14. The vehicle engine automatic control device according to claim 4,
- wherein the engine stopping/re-starting unit, during coast drive, stops the engine when the amount of brake operation that is detected falls below a second threshold, which is greater than the first threshold, and drives the engine when the amount of brake operation that is detected is equal to or greater than the second threshold; and
- wherein the threshold setting unit sets the second threshold smaller as the deceleration increases.

15. The vehicle engine automatic control device according to claim 6, wherein the threshold setting unit sets the second threshold based on a predetermined map.

16. The vehicle engine automatic control device according to claim 6, wherein the threshold setting unit sets the second threshold based on a predetermined algorithm.

* * * * *